United States Patent
Pan et al.

(10) Patent No.: US 8,705,941 B2
(45) Date of Patent: Apr. 22, 2014

(54) APPARATUS AND METHOD OF PROCESSING INFORMATION AND PROGRAM

(75) Inventors: Qing Pan, Tokyo (JP); Shuichi Chihara, Kanagawa (JP); Hidekazu Kamon, Kanagawa (JP)

(73) Assignee: Sony Corporation (JP)

( * ) Notice: Subject to any disclaimer, the term of this patent is extended or adjusted under 35 U.S.C. 154(b) by 1139 days.

(21) Appl. No.: 11/792,882

(22) PCT Filed: Sep. 28, 2006

(86) PCT No.: PCT/JP2006/019256
§ 371 (c)(1),
(2), (4) Date: Feb. 14, 2008

(87) PCT Pub. No.: WO2007/043344
PCT Pub. Date: Apr. 19, 2007

(65) Prior Publication Data
US 2009/0060455 A1    Mar. 5, 2009

(30) Foreign Application Priority Data
Oct. 11, 2005 (JP) ................ P2005-295890

(51) Int. Cl.
*G11B 27/034* (2006.01)
(52) U.S. Cl.
USPC ........................... 386/278; 345/699
(58) Field of Classification Search
USPC ................. 386/96, 30, 31; 345/699
See application file for complete search history.

(56) References Cited

U.S. PATENT DOCUMENTS

| | | | |
|---|---|---|---|
| 2003/0185400 A1 | 10/2003 | Yoshizawa et al. | |
| 2005/0028211 A1 | 2/2005 | Mochizuki et al. | |
| 2005/0068346 A1* | 3/2005 | Ogawa et al. ......... | 345/699 |
| 2005/0128349 A1 | 6/2005 | Takamori et al. | |
| 2005/0141857 A1* | 6/2005 | Shimozawa et al. ......... | 386/46 |
| 2006/0239643 A1* | 10/2006 | Takakuwa et al. ........... | 386/95 |

FOREIGN PATENT DOCUMENTS

| | | | | | |
|---|---|---|---|---|---|
| JP | 2002-140055 A | 5/2002 | | | |
| JP | 2003-110646 A | 4/2003 | | | |
| JP | 2003-274301 A | * | 9/2003 | ............... | H04N 5/44 |
| JP | 2004-7389 A | 1/2004 | | | |
| JP | 2005-57714 A | 3/2005 | | | |
| JP | 2005-109703 A | 4/2005 | | | |
| JP | 2005-167895 A | 6/2005 | | | |
| JP | 2005-175570 A | 6/2005 | | | |

* cited by examiner

*Primary Examiner* — Jason Gee
(74) *Attorney, Agent, or Firm* — Lerner, David, Littenberg, Krumholz & Mentlik, LLP

(57) ABSTRACT

The present invention relates to an information processing apparatus, an information processing method, and a program which are capable of rapidly and appropriately setting a format of an audio signal to be output to a display apparatus. When a monitor apparatus 12 is connected to an image processing apparatus 11 via an HDMI cable 13, the image processing apparatus 11 displays an audio format setup screen on the basis of EDID acquired from the monitor apparatus 12. Only the setup items of the audio signal, which the monitor apparatus 12 can receive, are enabled in the audio format setup screen. A user selects a format of the audio signal to be supplied from the image processing apparatus 11 to the monitor apparatus 12 on the audio format setup screen. The present invention is applicable to, for example, an information processing apparatus outputting an audio signal to a monitor.

11 Claims, 9 Drawing Sheets

APPARATUS AND METHOD OF PROCESSING INFORMATION AND PROGRAM

TECHNICAL FIELD

The present invention relates to information processing apparatuses, information processing methods, and programs. More particularly, the present invention relates to an information processing apparatus, an information processing method, and a program which are capable of rapidly and appropriately setting a format of an audio signal to be output to a display apparatus.

BACKGROUND ART

Hitherto, personal computers have been connected display devices through Digital Visual Interface (DVI) or analog RGB interfaces. Since audio signals cannot be included in the DVI or the analog RGB interfaces, it is necessary to provide another interface, for example, Sony Philips Digital Interface (S/PDIF) for the audio signals when the personal computers are connected to the display devices through the DVI or the analog RGB interfaces.

In addition, users must determine display settings, such as resolutions and scanning rates, of the display devices when the DVI or analog RGB interfaces are used. Accordingly, in order to adjust the display settings so as to make the best use of the capabilities of the display devices, it is necessary for the users to have certain knowledge about the display settings of the display devices. In other words, users who have no knowledge about the display settings of the display devices cannot set the display settings of the display devices to appropriate values, thus bringing about cases where images are not visible in the display devices.

Consequently, it is desirable to provide technologies of automatically setting the display settings of the display devices to appropriate values. For example, Patent Document 1 discloses a technology of enlarging or contracting the screen displayed in a display device when a predetermined event occurs. However, this technology does not update the resolution of the display device.

In High-definition Multimedia Interface (HDMI) that has been developed from the DVI and that is begun to be adopted in consumer devices, such as home electronic appliances or audio visual apparatuses, the display in a display devices is optimized in accordance with connected devices. In addition, it is possible to transmit not only image signals but also audio signals to the connected devices with the HDMI.

Japanese Unexamined Patent Application Publication No. 2002-140055

DISCLOSURE OF INVENTION

Problems to be Solved by the Invention

However, it is hard to say that output of appropriate audio signals in accordance with the connected devices is considered in the HDMI.

Accordingly, it is desirable to rapidly and appropriately set a format of an audio signal to be output to a display device.

Means for Solving the Problems

An information processing apparatus outputting an audio signal to a display apparatus that is connected, according to an embodiment of the present invention, includes acquiring means for acquiring information concerning a format of the audio signal, which the display apparatus can receive, from the display apparatus; first storing means for storing the acquired information; and setting means for reading out the information stored in the first storing means if the information is stored in the first storing means to set the audio signal to a predetermined format included in the information.

The acquiring means may store the acquired information in the first storing means and may issue an event indicating that the information is stored in the first storing means. The setting means may read out the information stored in the first storing means if the event is detected to set the audio signal to a predetermined format included in the information.

The display apparatus may be connected to the information processing apparatus via High-Definition Multimedia Interface. The information may be extended display identification data.

The information may include information concerning an encoding format, a sampling rate, the number of bits, or the number of channels of the audio signal.

The information processing apparatus further includes screen generating means for generating, on the basis of the information, a screen in which at least one setup item for the format of the audio signal is displayed; and selecting means for selecting a predetermined setup item from the at least one setup item displayed in the screen. The setting means may set the audio signal to a format in accordance with the predetermined setup item selected by the selecting means.

The information processing apparatus further includes second storing means for storing the selected predetermined setup time. The screen generating means may generate the screen in which the selected predetermined setup item is selected in advance when the information processing apparatus is connected to the display apparatus again.

An information processing method for an information processing apparatus outputting an audio signal to a display apparatus that is connected, according to another embodiment of the present invention, includes the steps of acquiring information concerning a format of the audio signal, which the display apparatus can receive, from the display apparatus; storing the acquired information in storing means; and reading out the information stored in the storing means if the information is stored in the storing means to set the audio signal to a predetermined format included in the information.

A program causing a computer to perform a process of outputting an audio signal to a display apparatus that is connected, according to another embodiment of the present invention, includes the steps of acquiring information concerning a format of the audio signal, which the display apparatus can receive, from the display apparatus; storing the acquired information in storing means; and reading out the information stored in the storing means if the information is stored in the storing means to set the audio signal to a predetermined format included in the information.

According to embodiments of the present invention, when the information concerning the format of the audio signal, which the display apparatus can receive, is acquired from the display apparatus, the acquired information is stored in the storing means, and the information is stored in the stored in the storing means, the information stored in the storing means is read out to set the audio signal to the predetermined format included in the information.

According to the present invention, it is possible to rapidly and appropriately set a format of an audio signal to be output to a display apparatus.

Figure 1:
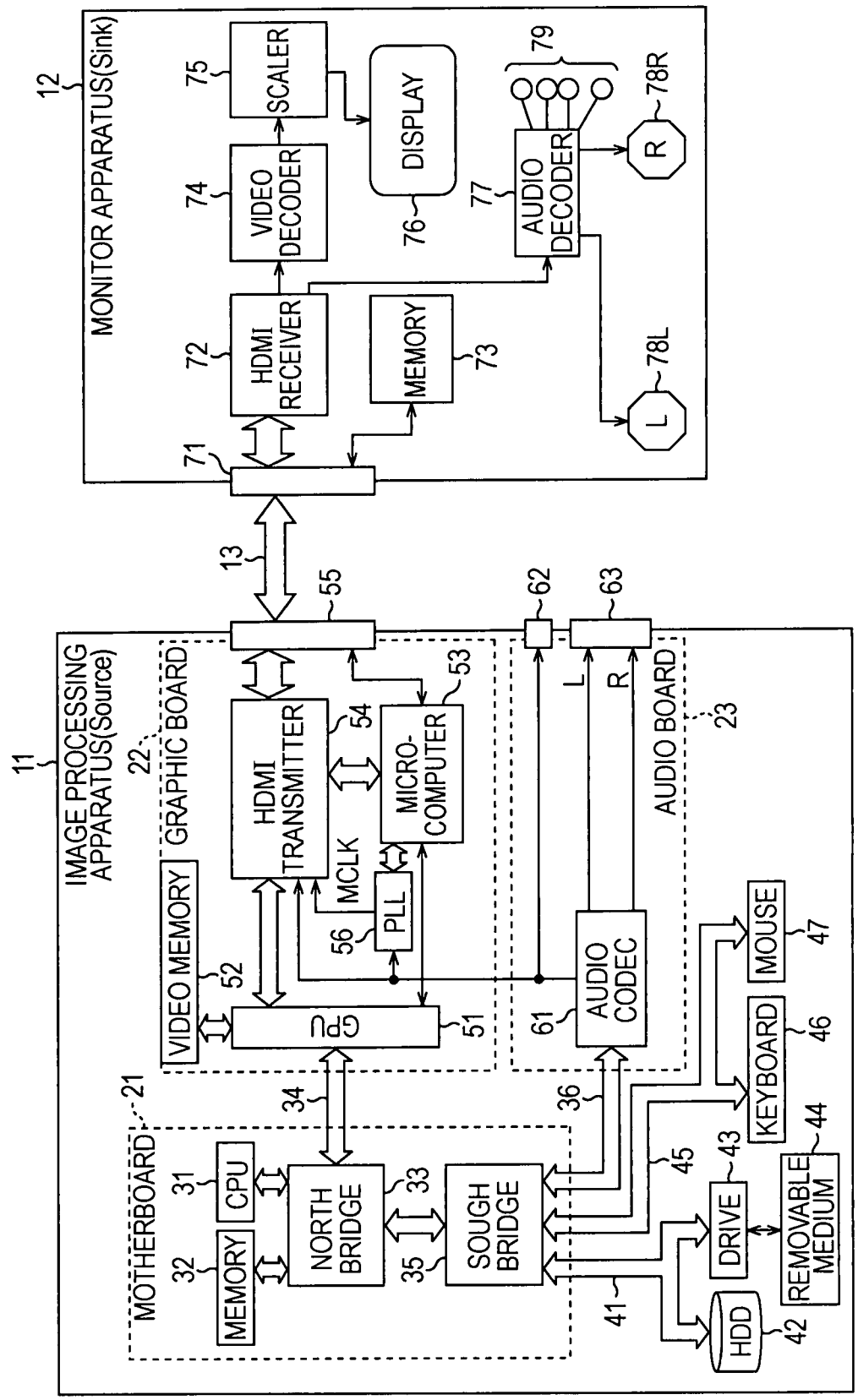
FIG. 1 is a block diagram showing an example of the structure of an image processing apparatus according to an embodiment of the present invention.

REFERENCE NUMERALS 11 image processing apparatus
101 video controller
102 audio controller
103 storage unit
104 controller unit
105 operation unit
111 EDID acquirer
121 EDID storage area
122 user setup information storage area
123 content data storage area

BEST MODE FOR CARRYING OUT THE INVENTION

Embodiments of the present invention will now be described with reference to the attached drawings.

FIG. 1 shows an example of the structure of an image processing apparatus according to an embodiment of the present invention.

Referring to FIG. 1, an image processing apparatus 11 is connected to a monitor apparatus 12 via a High-definition Multimedia Interface (HDMI) cable 13. The image processing apparatus 11 is a source apparatus that supplies an image or audio (an image signal or audio signal) and that is defined according to the HDMI specification. The monitor apparatus is a sink apparatus that receives the image or audio.

The image processing apparatus 11 at least includes a motherboard 21, a graphic board 22, and an audio board 23. The motherboard 21 includes a central processing unit (CPU) 31, a memory 32, a north bridge 33, and a south bridge 35. The CPU 31 is connected to the north bridge 33. The north bridge 33 is connected to the CPU 31, the memory 32, the south bridge 35, and the graphic board 22.

The CPU 31 executes a variety of processing in accordance with programs stored in the memory 32 or a hard disk drive (HDD) 42 described below. For example, the CPU executes programs for an operation system (OS), a video driver, and an audio driver, loaded from the HDD 42 into the CPU 31. The OS includes programs controlling the basic operation of the image processing apparatus 11. The video driver includes programs controlling the graphic board 22. The audio driver includes programs controlling the audio board 23. The memory 32 includes a read only memory (ROM) and a random access memory (RAM). The programs, for example, the OS executed by the CPU 31 and data that must be temporarily stored for a variety of processing are stored in the memory 32.

The north bridge 33 controls the graphic board 22 via a bus 34, such as a PCI express bus. The south bridge 35 controls the audio board 23 via an audio bus 36. The HDD 42 is connected to the south bridge 35 via an Integrated Drive Electronics (IDE) bus 41 and a drive 43 is also connected to the south bridge 35 via the IDE bus 41, if needed. The HDD stores the various programs executed by the CPU 31 and content data to be supplied to the monitor apparatus 12. A removable medium 44, such as a magnetic disk, an optical disc, or a magneto-optical disk, is appropriately loaded in the drive 43 and programs read out from the removable medium are installed in the HDD 42, if needed. A keyboard 46 and a mouse 47 are also connected to the south bridge 35 via a Low Pin Count (LPC) bus 45.

The graphic board 22 includes a graphics processing unit (GPU) 51, a video memory 52, a microcomputer 53, an HDMI transmitter 54, an HDMI connector 55, and a phase locked loop (PLL) 56.

The GPU 51 encodes or decodes an image signal supplied from the north bridge 33 through the bus 34. For example, an image signal that is encoded in a predetermined format (for example, Moving Picture Experts Group 2 (MPEG-2)) and that is stored in the HDD 42 is supplied to the GPU 51 through the south bridge 35 and the north bridge 33. The GPU 51 decodes the supplied image signal and supplies the decoded image signal to the HDMI transmitter 54. The GPU 51 can supply the encoded image signal to the HDMI transmitter 54 without decoding the image signal. If an image signal is supplied from, for example, a communication unit (not shown) to the GPU 51, the GPU 51 encodes the supplied image signal in a predetermined format. The encoded image signal is stored in, for example, the HDD 42.

The video memory 52 temporarily stores the image signal to be processed in the GPU 51. The microcomputer 53 refers to a register in the PLL 56 to control the HDMI transmitter 54. For example, the microcomputer 53 refers to the register in the PLL 56 to detect switching of the sampling rate of an audio signal supplied from (an audio CODEC 61 in) the audio board 23 to the HDMI transmitter 54 and switches the control timing of the HDMI transmitter 54. In addition, the microcomputer 53 stores (records) extended display identification data (EDID), acquired from the monitor apparatus 12 through the HDMI cable 13, in the HDD 42 through the GPU 51, the north bridge 33, and so son. As described below with reference to FIG. 3, information indicating the capability of the monitor apparatus 12, such as the resolution of the image signal which the monitor apparatus 12 can receive and the format of the audio signal (the encoding format, the sampling rate, and the number of bits), is described in the EDID, along with a monitor ID used for identifying the monitor apparatus 12.

The HDMI transmitter 54 converts the image signal supplied from the GPU 51 and the audio signal supplied from (the audio CODEC 61 in) the audio board 23 into a signal in the HDMI format (hereinafter referred to as an HDMI signal) and supplies the signal resulting from the conversion to the monitor apparatus 12 through the HDMI connector 55. A master clock (MCLK) extracted from the audio signal is also supplied from the PLL 56 to the HDMI transmitter 54. The HDMI transmitter 54 performs the conversion into the HDMI signal on the basis of the master clock. The PLL 56 extracts the master clock from the bi-phase audio signal supplied from the audio CODEC 61 and supplies to the microcomputer 53 the information (the encoding format, the sampling rate, the number of bits, etc.) concerning the audio signal supplied from the audio CODEC 61 to the HDMI transmitter 54.

The audio board 23 includes the audio CODEC 61, an S/PDIF output terminal 62, and an analog output terminal (RCA output terminal) 63. The audio CODEC 61 encodes or decodes the audio signal supplied from the south bridge 35 through the audio bus 36. For example, the audio CODEC 61 encodes the audio signal supplied from the south bridge 35 through the audio bus 36 in a linear pulse code modulation (PCM) format or an Audio Code number 3 (AC3) format, converts the encoded audio signal into a signal conforming to the S/PDIF, and supplies the converted audio signal to the HDMI transmitter 54, the PLL 56, and the S/PDIF output terminal 62. If the audio signal supplied from the south bridge 35 is encoded in a format different from the output format, the audio CODEC 61 decodes the encoded image signal and encodes the image signal in the output format. In addition, the audio CODEC 61 converts a digital audio signal supplied from the south bridge 35 through the audio bus 36 into an analog audio signal and outputs the analog audio signal through the analog output terminal 63. The analog output terminal 63 includes two terminals: a left terminal (L) and a right terminal (R). Although the audio signal is supplied to the HDMI transmitter 54 through the audio CODEC 61 in this embodiment, the HDMI transmitter 54 may be connected to the audio bus 36 to directly receive the audio signal from the south bridge 35. In this case, the PLL 56 may be omitted herein.

The monitor apparatus 12 includes an HDMI connector 71, an HDMI receiver 72, a memory 73, a video decoder 74, a scaler 75, a display 76, an audio decoder 77, a left speaker 78L, a right speaker 78R, and 5.1 channel output terminals 79.

The HDMI signal supplied from the HDMI connector 55 in the image processing apparatus 11 to the HDMI connector 71 through the HDMI cable 13 is supplied to the HDMI receiver 72. The HDMI receiver 72 separates the supplied HDMI signal into an image signal component and an audio signal component and supplies the image signal component to the video decoder 74 and the audio signal component to the audio decoder 77. The memory 73 is, for example, a dynamic random access memory (DRAM) and stores the EDID concerning the monitor apparatus 12. The EDID stored in the memory 73 is transmitted to the image processing apparatus 11 according to Display Data Channel (DDC) standard when the image processing apparatus 11 is connected to the monitor apparatus 12 via the HDMI cable 13.

The video decoder 74 decodes the image signal supplied from the HDMI receiver 72 in a predetermined format and supplies the decoded image signal to the scaler 75. The scaler 75 performs scaling to the image signal so as to support the display 76 and supplies the image signal subjected to the scaling to the display 76. The display 76 is, for example, a liquid crystal display (LCD) or a cathode ray tube (CRT) and displays an image corresponding to the supplied image signal.

The audio decoder 77 decodes the audio signal supplied from the HDMI receiver 72 in a predetermined format and converts the audio signal into an analog signal. The audio decoder 77 supplies the analog signal to the left speaker 78L, the right speaker 78R, or the 5.1 channel output terminals 79. The left speaker 78L, the right speaker 78R, and the 5.1 channel output terminals 79 each output an audio corresponding to the supplied audio signal. The 5.1 channel output terminals 79 include four output terminals for a central channel, a right rear channel, a left rear channel, and a woofer channel. The left speaker 78L and the right speaker 78R are also used as left and right front channels.

In the image processing apparatus 11 and the monitor apparatus 12 having the above structures, when the HDMI connector 55 in the image processing apparatus 11 is connected to the HDMI connector 71 in the monitor apparatus via the HDMI cable 13, the EDID stored in the memory 73 in the monitor apparatus 12 is transmitted to the image processing apparatus 11. The image processing apparatus 11 outputs the image signal and the audio signal in a format appropriate for the capability of the monitor apparatus 12 on the basis of the EDID acquired from the monitor apparatus 12.

Figure 2:
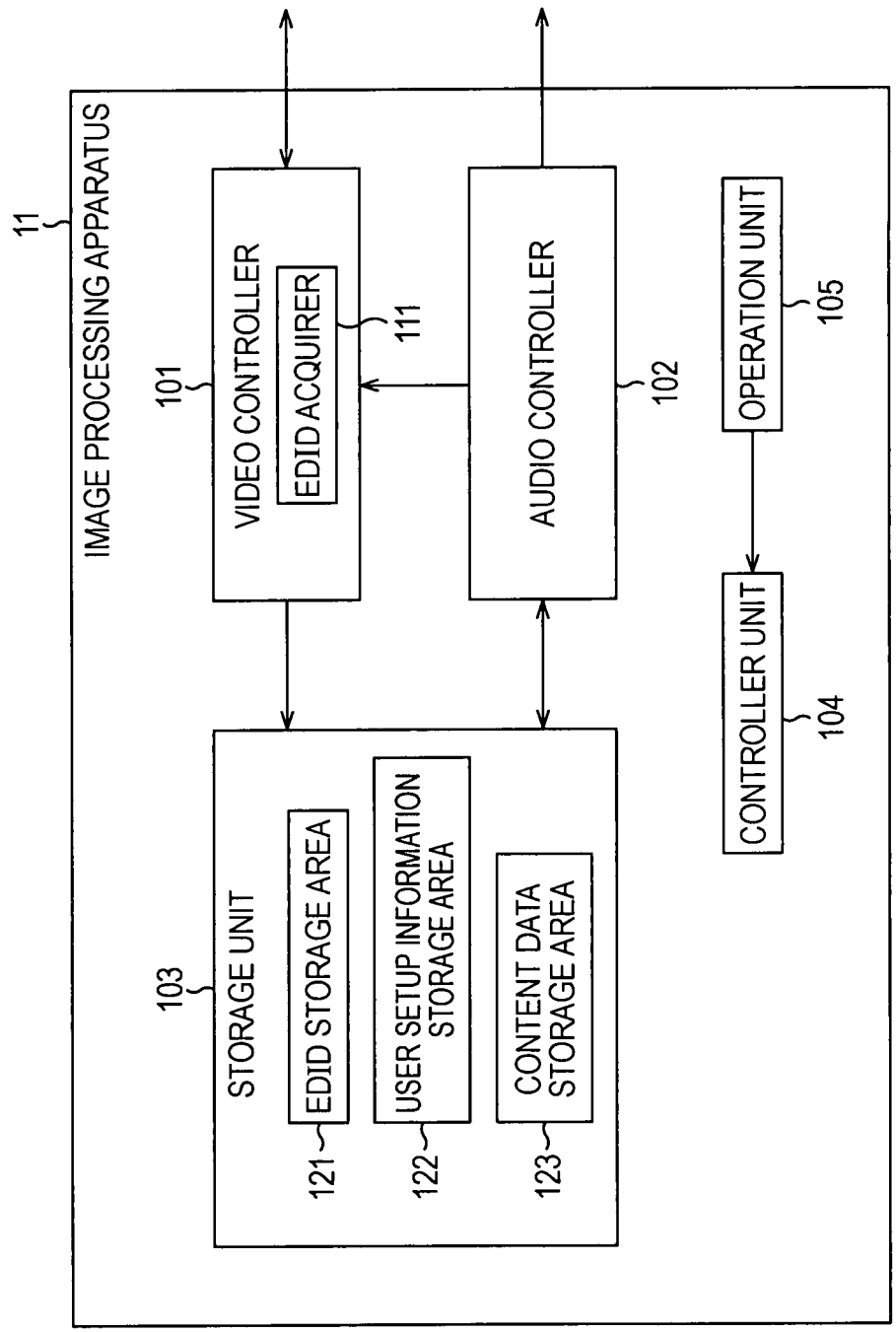
FIG. 2 is a functional block diagram showing an example of the functional structure of the image processing apparatus 11.

FIG. 2 is a functional block diagram showing an example of the functional structure of the image processing apparatus 11 when the image processing apparatus 11 sets (determines) formats of the image signal and the audio signal in order to supply the image signal and the audio signal in the format appropriate for the capability of the monitor apparatus 12. Signal lines from a controller unit 104 to the components in the image processing apparatus 11 are not shown in FIG. 2.

Referring to FIG. 2, the image processing apparatus 11 includes a video controller 101, an audio controller 102, a storage unit 103, the controller unit 104, and an operation unit 105. The video controller 101 includes an EDID acquirer 111. The storage unit 103 includes an EDID storage area 121, a user setup information storage area 122, and a content data storage area 123.

The image signal encoded in a predetermined format is supplied from the content data storage area 123 to the video controller 101 through the controller unit 104. The video controller 101 decodes the encoded the image signal, converts the image signal into an image signal in a predetermined format (such as 720p or 1080i described below), converts the image signal into an HDMI signal, and supplies the HDMI signal to the monitor apparatus 12 (FIG. 1). When the audio signal is supplied from the audio controller 102 to the video controller 101, the video controller 101 supplies the audio signal to the monitor apparatus 12 with the audio signal being included in the HDMI signal.

When the image processing apparatus 11 is connected to the monitor apparatus 12 via the HDMI cable 13, the EDID acquirer 111 in the video controller 101 acquires the EDID from the monitor apparatus 12 and stores the acquired EDID in the EDID storage area 121 in the storage unit 103. The EDID acquirer 111 issues an event indicating that the EDID is stored to the controller unit 15 when the EDID acquired from the monitor apparatus 12 is stored in the EDID storage area 121. The video controller 101 corresponds to the graphic board 22 in FIG. 1 and the video driver controlling the graphic board 22 (executed by the CPU 31).

The audio controller 102 accesses the EDID storage area in the storage unit 103 if the controller unit 104 indicates the event indicating that the EDID is written to acquire EDID concerning the active monitor, that is, the monitor apparatus 12 currently connected to the image processing apparatus 11 in a manner described below.

The audio controller 102 checks the user setup information storage area 122 on the basis of the monitor ID included in the acquired EDID to determine whether the monitor apparatus 12 that is currently connected to the image processing apparatus 11 was previously connected to the image processing apparatus 11. If the monitor apparatus 12 was not previously connected to the image processing apparatus 11, that is, if no data having the same ID as the acquired monitor ID is stored in the user setup information storage area 122, the audio controller 102 supplies only information (hereinafter appropriately referred to as audio format information) concerning the format of the audio signal which the monitor apparatus 12 can receive to the controller unit 104 on the basis of the acquired EDID. If the monitor apparatus 12 was previously connected to the image processing apparatus 11, the audio controller 102 supplies information (hereinafter appropriately referred to as user setup information) that is stored in the user setup information storage area 122 and that concerns the format of the audio signal, which was set by the user when the monitor apparatus 12 was previously connected to the image processing apparatus 11, to the controller unit 104 along with the audio format information. The audio controller 102 receives the format of the audio signal, set by the user on the basis of the supplied audio format information, from the controller unit 104.

The audio controller 102 converts the audio signal supplied from the content data storage area 123 through the controller unit 104 into the format that is supplied from the controller unit 104 and that is set by the user and supplies the converted audio signal to the video controller 101 and to the S/PDIF output terminal 62 or the analog output terminal 63 (FIG. 1). The audio controller 102 supplies the audio signal after the analog conversion to the analog output terminal 63.

The audio controller 102 corresponds to the audio board 23 in FIG. 1 and the audio driver controlling the audio board 23 (executed by the CPU 31).

The storage unit 103 corresponds to the HDD 42 in FIG. 1 and stores a variety of data. For example, the EDID storage area 121 stores the EDID that is supplied from the EDID acquirer 111 and that concerns the monitor (for example, the monitor apparatus 12) connected to the image processing apparatus 11. The user setup information storage area 122 stores information (the user setup information) concerning the format of the audio signal set by the user when the monitor was previously connected to the image processing apparatus 11. The content data storage area 123 stores content data (the image signal and the audio signal) concerning a broadcasting program or a movie, received by a tuner or a communication unit (not shown).

The controller unit 104 corresponds to, for example, the OS (executed by the CPU 31) in FIG. 1 and controls the components in the image processing apparatus 11. For example, if the event indicating that the EDID is stored is issued from the EDID acquirer 111 in the video controller 101, the controller unit 104 indicates that the EDID is stored to the audio controller 102. If the audio format information concerning the monitor apparatus 12 is supplied from the audio controller 102, the controller unit 104 generates screen data for an audio format setup screen where the audio format information is displayed and supplies the generated data to the video controller 101. The screen data for the audio format setup screen is supplied to the monitor apparatus 12 through the video controller 101 and is displayed as the audio format setup screen in the monitor apparatus 12. The user refers to the audio format setup screen to select a desired setup item from multiple setup items used for determining the format of the audio signal, which the monitor apparatus 12 can receive, with the operation unit 105. An operation signal corresponding to the selection operation by the user is supplied from the operation unit 105 to the controller unit 104, which recognizes which setup item is selected and supplies the recognition result to the audio controller 102. The audio controller 102 outputs the audio signal in the format in accordance with the selected setup item.

For example, if an operation signal instructing that predetermined content data is to be played back is supplied from the operation unit 105 to the controller unit 104, the controller unit 104 acquires the specified content data from the content data storage area 123 in response to the operation signal and supplies the image signal and audio signal corresponding to the content data to the video controller 101 and the audio controller 102, respectively.

The operation unit 105 corresponds to the keyboard 46 and the mouse 47 in FIG. 1 and supplies an operation signal corresponding to an operation by the user to the controller unit 104. For example, if the user performs an operation to play back a predetermined piece of the content data, among pieces of the content data stored in the content data storage area 123, the operation unit 105 supplies an operation signal corresponding to the operation to the controller unit 104.

Figure 3:
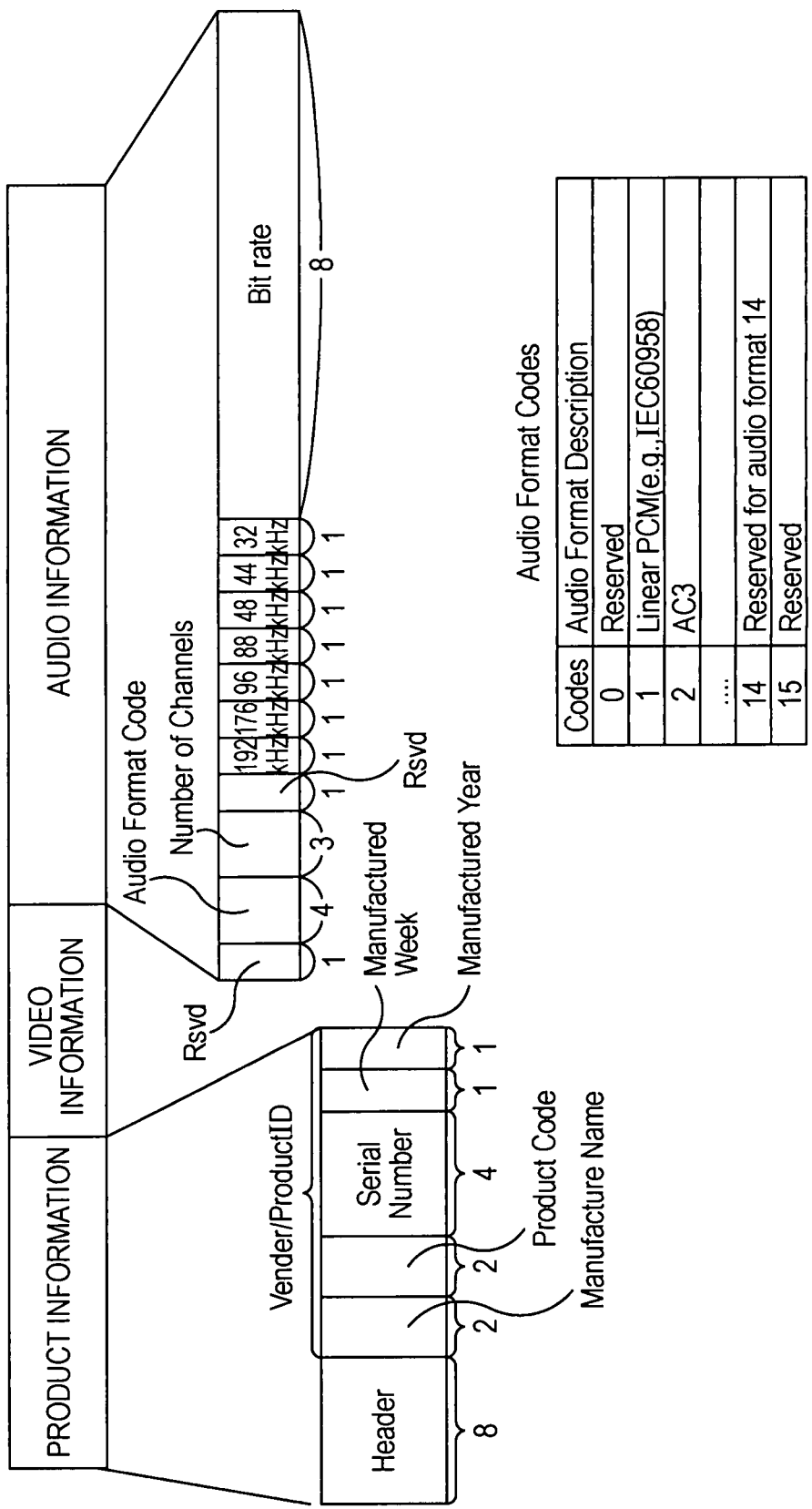
FIG. 3 shows the content of EDID.

The content of the EDID acquired from the monitor apparatus 12 will now be described with reference to FIG. 3. FIG. 3 shows the format of the EDID.

The EDID includes product information indicating the kind of the monitor apparatus 12, video information about the format of the image signal which the monitor apparatus can receive, and audio information about the format of the audio signal which the monitor apparatus 12 can receive, as shown in FIG. 3.

An eight-byte header, a two-byte manufacture name, a two-byte product code, a four-byte serial number, a one-byte manufactured week (counting from the beginning of the year), and a one-byte manufactured year are sequentially described in the product information.

The format (resolution) of the image signal, which the monitor apparatus 12 can receive, is described in the video information. The format includes 720p corresponding to a progressive image having 720 effective scanning lines and 1080i corresponding to an interlace image having 1,080 effective scanning lines.

The audio information has three bytes (24 bits). As shown in FIG. 3, a one-bit reserved area (Rsvd), a four-bit audio format code, and a three-bit number of channels are sequentially described in the first one byte (eight bits) in the audio information. For example, the four-bit audio format code indicates that the audio signal encoded in the linear PCM format can be received if the audio format code is set to "1" and indicates that the audio signal encoded in the AC3 format can be received if the audio format code is set to "2", as shown in a table in FIG. 3.

A one-bit reserved area (Rsvd) and seven-bit information indicating whether the sampling rates 192 kHz, 176 kHz, 96 kHz, 88 kHz, 48 kHz, 44.1 kHz, and 32 kHz are supported are sequentially described in the subsequent one byte (eight bits) in the audio information. For example, if the bit indicating whether the sampling rate 192 kHz is supported is set to "1", the monitor apparatus 12 can receive the audio signal at a sampling rate of 192 kHz.

The number of bits (quantifying bit number) is described in the subsequent one byte (eight bits) in the audio information.

The EDID in the above format is acquired and is stored in the EDID storage area 121 in the storage unit 103.

In the EDID storage area 121, the acquired EDID in the format shown in FIG. 3 is stored, for example, as a registry (file) of the OS, such as Windows Xp (registered trademark).

Figure 4:
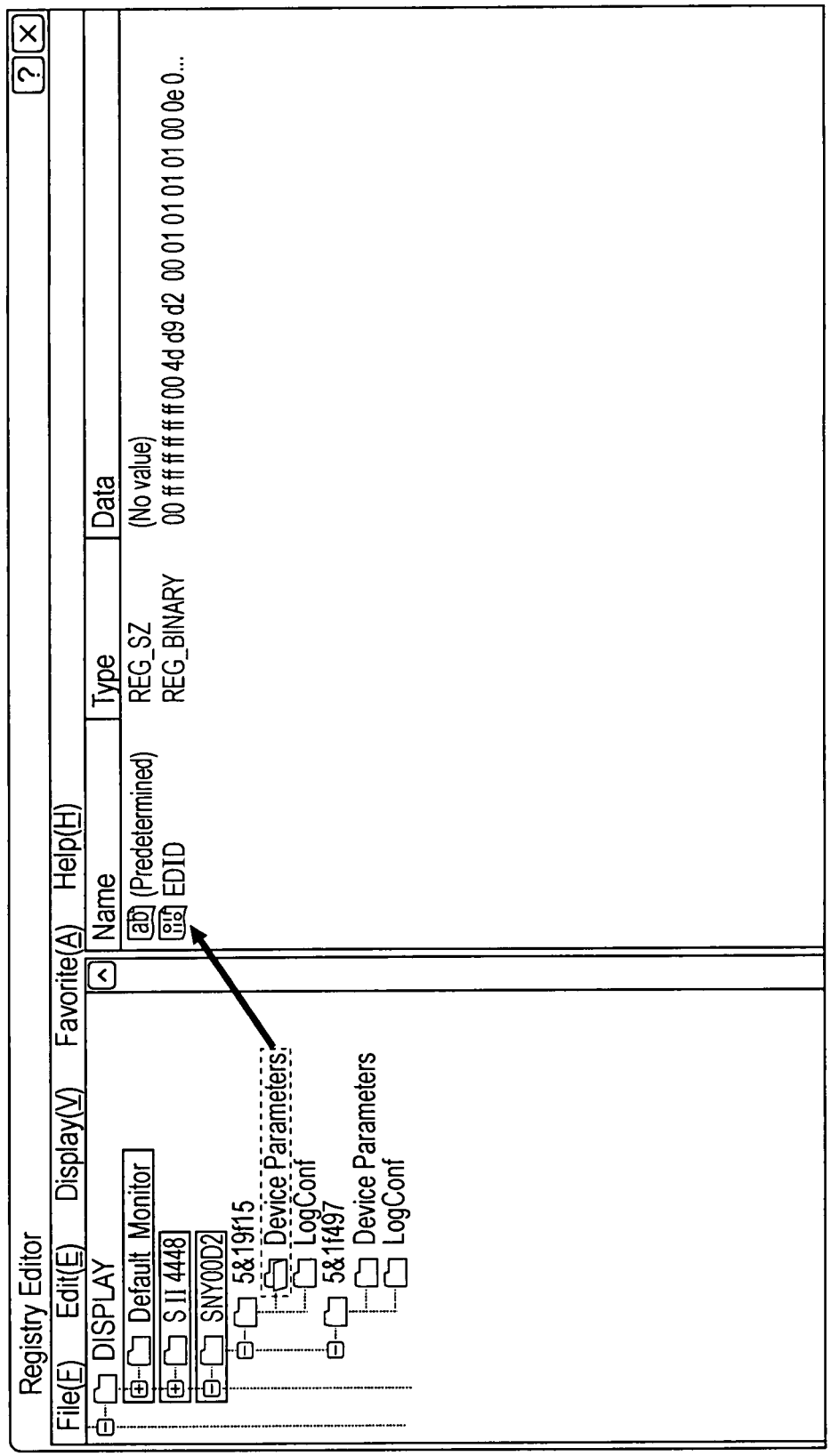
FIG. 4 shows the content stored in an EDID storage area 121.

FIG. 4 shows an example of a screen when the content of the EDID storage area 121 is displayed in a registry editor.

In the registry (file), the settings of the setup items in the display are stored under a "DISPLAY" directory. In the example shown in FIG. 4, "Default_Monitor", "SII4448", and "SNY00D2" directories exist under the "DISPLAY" directory. The EDID concerning the monitor to which the image processing apparatus 11 is connected as default is stored in the "Default_Monitor" directory. The "SII4448" and "SNY00D2" directories generated under the "DISPLAY" directory indicate that monitors "SII4448" and "SNY00D2", to which the image processing apparatus 11 is not connected as default, were previously connected to the image processing apparatus 11 (including the current connection). The "SII4448" and "SNY00D2", which indicate the directory names, also indicate the manufacture names of the monitors.

In the example shown in FIG. 4, "5&19f15" and "5&1f497" directories are provided under the "SNY00D2" directory. The "5&19f15" and "5&1f497" represent, for example, the serial numbers of the monitor. Accordingly, it is shown in FIG. 4 that the two "SNY00D2" monitors having different serial numbers were previously connected to the image processing apparatus 11.

"Device Parameter" and "LogConf" directories are provided under the respective "5&19f15" and "5&1f497" directories.

The EDID that is acquired from each monitor by the image processing apparatus 11 is stored in the "Device Parameters" directory. For example, in the case of the "SNY00D2" monitor having the serial number "5&19f15", the information about the EDID described above with reference to FIG. 3 is stored as binary data "00 ff ff ff ff ff ff 00 4d d9 d2 00 01 01 01 01 00 0e . . . ", as shown in the right pane in FIG. 4.

If the event indicating that the EDID is written is indicated by the controller unit 104, the audio controller 102 acquires the piece of the EDID concerning the active monitor apparatus 12 (currently connected to the image processing apparatus 11) from the pieces of the EDID concerning the monitors, stored in the EDID storage area 121 in the manner shown in FIG. 4, and supplies the acquired EDID to the controller unit 104 as the audio format information.

Figure 5:
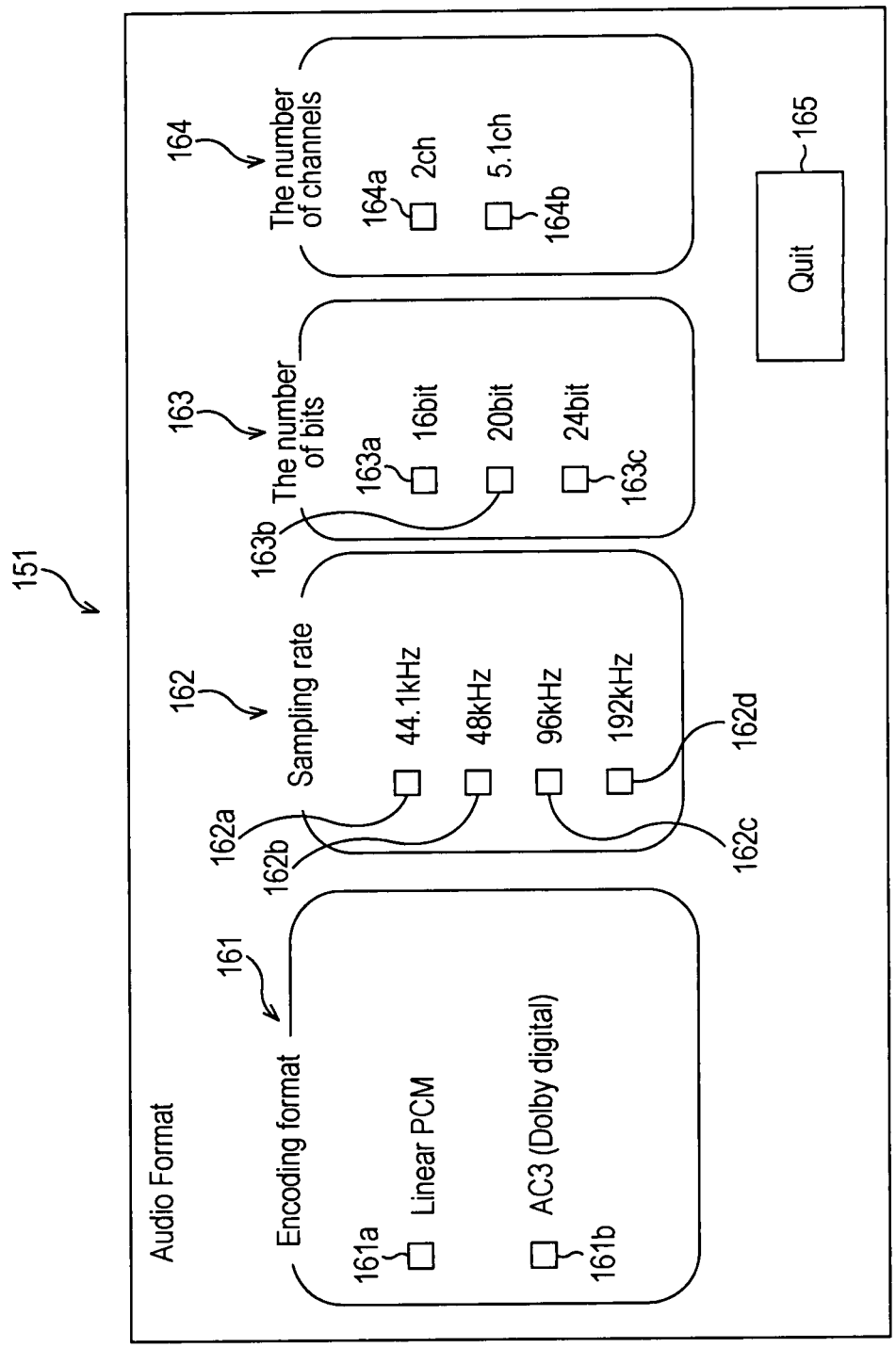
FIG. 5 shows an example of an audio format setup screen.

FIG. 5 shows an example of an audio format setup screen which the controller unit 104 displays in the monitor apparatus 12 on the basis of the audio format information concerning the monitor apparatus 12, supplied from the audio controller 102.

An audio format setup screen 151 in FIG. 5 includes, in addition to a title "Audio Format", an encoding format setup item 161, a sampling rate setup item 162, a number of bits setup item 163, a number of channels setup item 164, and a Quit button 165.

Information corresponding to the audio format code in the audio information in the EDID is displayed in the encoding format setup item 161. Information corresponding to the sampling rate in the audio information in the EDID is displayed in the sampling rate setup item 162. Information corresponding to the number of bits in the audio information in the EDID is displayed in the number of bits setup item 163. Information corresponding to the number of channels in the audio information in the EDID is displayed in the number of channels setup item 164.

For example, the encoding format setup item 161 in FIG. 5 indicates that the monitor apparatus 12 can output audios in the linear PCM format and/or the AC3 format. The user determines whether the audio signal encoded in the linear PCM format or the AC3 format is supplied to the monitor apparatus 12 and checks (selects) a check box 161a or 161b corresponding to the determination result.

The sampling rate setup item 162 indicates that the monitor apparatus 12 can output an audio at least one of sampling rates 44.1 kHz, 48 kHz, 96 kHz, and 192 kHz. The user determines whether the audio signal at a sampling rate of 44.1 kHz, 48 kHz, 96 kHz, or 192 kHz is supplied to the monitor apparatus 12 and checks (selects) a check box 162a, 162b, 162c, or 162d corresponding to the determination result.

The number of bits setup item 163 indicates that the monitor apparatus 12 can output an audio having at least one of the numbers of bits: 16 bits, 20 bits, and 24 bits. The user determines whether the 16-bit, 20-bit, or 24-bit audio signal is supplied to the monitor apparatus 12 and checks (selects) a check box 163a, 163b, or 163c corresponding to the determination result.

The number of channels setup item 164 indicates that the monitor apparatus 12 can output 2-channel and/or 5.1-channel (surround) audios. The user determines whether the 2-channel or 5.1-channel audio signal is supplied to the monitor apparatus 12 and checks (selects) a check box 164a or 164b corresponding to the determination result.

Figure 6:
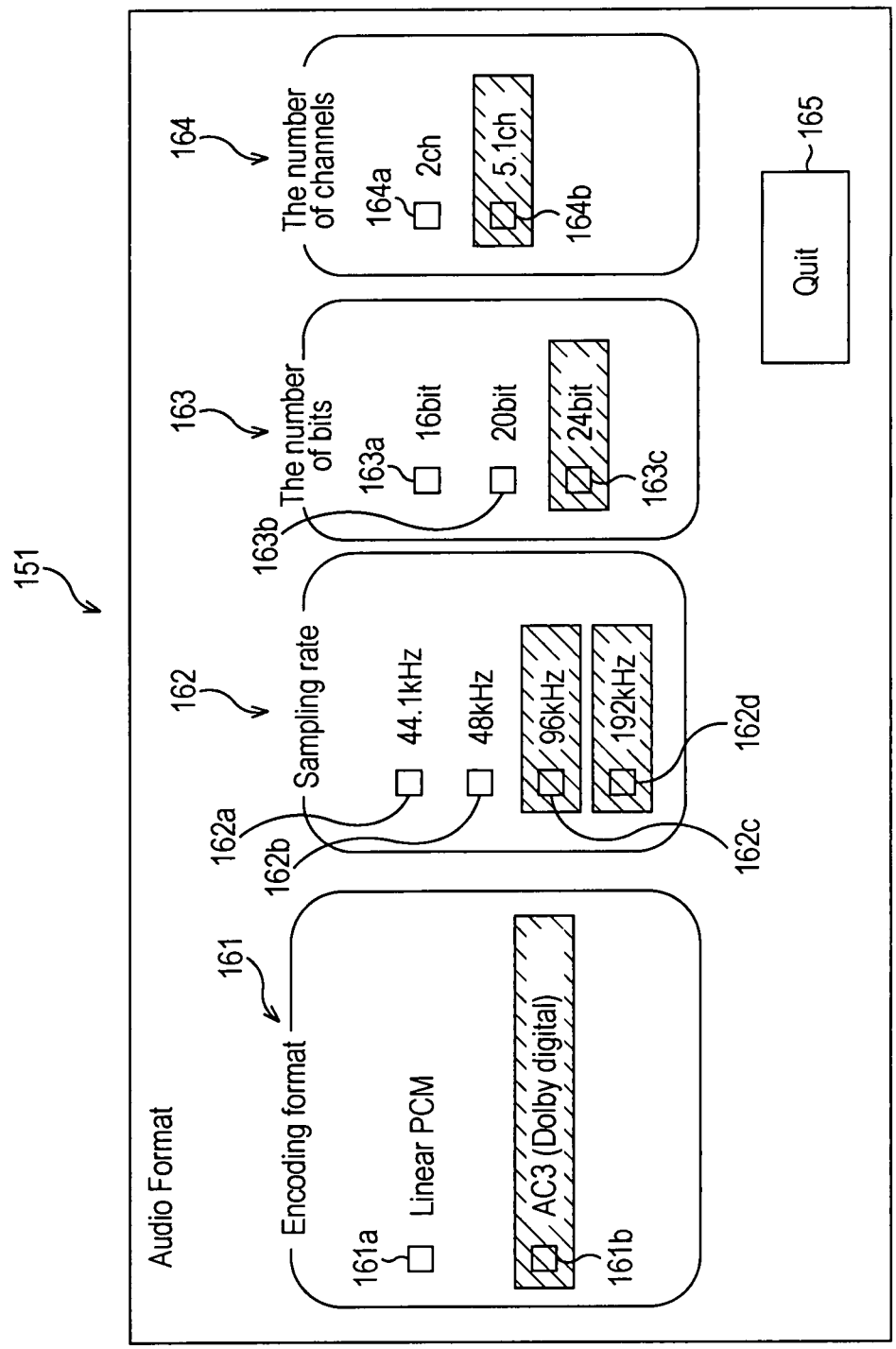
FIG. 6 shows an example of another audio format setup screen.

FIG. 6 shows an example of an audio format setup screen in another monitor (hereinafter referred to as the other monitor) other than the monitor apparatus 12.

Provided that information indicating that only the audio signal encoded in the linear PCM format can be received is described in the EDID acquired from the other monitor, the AC3 format is disabled in the encoding format setup item 161 in the audio format setup screen 151 in FIG. 6. In the example in FIG. 6, setup items which the user cannot select are hatched for convenience.

Provided that information indicating that the audio signals at the sampling rates 44.1 kHz and 48 kHz can be received is described in the EDID acquired from the other monitor, the sampling rates 96 kHz and 192 kHz are disabled in the sampling rate setup item 162 in the audio format setup screen 151 in FIG. 6.

Similarly, provided that information indicating that the 16-bit and 20-bit audio signals can be received is described in the EDID acquired from the other monitor, the 24 bit is disabled in the number of bits setup item 164 in the audio format setup screen 151 in FIG. 6.

Provided that information indicating that the only 2-channel audio signal can be received is described in the EDID acquired from the other monitor, the 5.1-channel is disabled in the number of channels setup item 164 in the audio format setup screen 151 in FIG. 6.

The user can refer to the audio format setup screen 151 shown in FIG. 5 or 6 to select (specify) a desired setup item for each of the setup items of the encoding format, the sampling rate, the number of bits, and the number of channels. Among the setup items of the encoding format, the sampling rate, the number of bits, and the number of channels displayed in the audio format setup screen 151, only the setup items which the monitor apparatus 12 currently connected to the image processing apparatus 11 can receive are enabled on the basis of the acquired EDID. Accordingly, even the user who is not familiar with the setup of the audio output is free from inappropriate settings.

The audio format setup screens 151 shown in FIGS. 5 and 6 are only examples of the information included in the EDID and the setup items in the audio format setup screen 151 are not limited to the ones shown in FIGS. 5 and 6. That is, other encoding formats, sampling rates, numbers of bits, and numbers of channels may be included in the audio format setup screen 151. For example, Advanced Audio Coding (AAC), Digital Theater System (DTS), or Direct Stream Digital (DSD) may be adopted as the encoding format.

Since the image processing apparatus 11 selects a setup item providing the highest resolution, among the formats (resolutions) which are stored in the video information in the EDID and which the monitor apparatus 12 can receive, for the video information in the EDID, no operation is required for the user.

An audio format setup process performed in the image processing apparatus 11 will now be described with reference to a flowchart shown in FIG. 7. The audio format setup process is started when the monitor apparatus 12 is connected to the image processing apparatus 11 via the HDMI cable 13.

In Step S1, the EDID acquirer 111 acquires EDID concerning the monitor apparatus 12. In Step S12, the EDID acquirer 111 stores (writes) the acquired EDID in the EDID storage area 121 in the storage unit 103.

In Step S13, the EDID acquirer 111 issues an event indicating that the EDID concerning the monitor apparatus 12 is written in the EDID storage area 121 to the controller unit 15.

In Step S14, the controller unit 104 indicates the event indicating that the EDID is written to the audio controller 102.

After receiving the event indicating that the EDID is written, then in Step S15, the audio controller 102 acquires the EDID concerning the active monitor, that is, the monitor apparatus 12 currently connected to the image processing apparatus 11 and goes to Step S16.

In Step S16, the audio controller 102 determines whether the connected monitor apparatus 12 was previously connected to the image processing apparatus 11. If the audio controller 102 determines in Step S16 that the monitor apparatus 12 was not previously connected to the image processing apparatus 11, that is, if no data having the same ID as the acquired monitor ID is stored in the user setup information storage area 122, then in Step S17, the audio controller 102 supplies audio format information based on the acquired EDID to the controller unit 104. The controller unit 104 generates screen data for the audio format setup screen, where the setup items of the encoding format, sampling rate, the number of bits, and the number of channels which the monitor apparatus 12 can receive are displayed, on the basis of the audio format information and supplies the generated screen data to the video controller 101 to display the audio format setup screen in the monitor apparatus 12.

If the audio controller 102 determines in Step S16 that the monitor apparatus 12 was previously connected to the image processing apparatus 11, then in Step S18, the audio controller 102 reads out the user setup information stored in the user setup information storage area 122 in association with the acquired monitor ID and supplies the readout user setup information to the controller unit 104, along with the audio format information.

In Step S19, the controller unit 104 generates screen data for the audio format setup screen in which the check box corresponding to each of the setup items that were previously set is checked as default, on the basis of the user setup information and the setup items of the encoding format, the sampling rate, the number of bits, and the number of channels, which are based on the audio format information and which the monitor apparatus 12 can receive, and supplies the generated screen data to the video controller 101 to display the audio format setup screen in the monitor apparatus 12.

After Step S17 or S19, then in Step S20, it is determined whether the user finishes the setup (update) of the setup items of the encoding format, the sampling rate, the number of bits, and the number of channels. The process waits until it is determined that the user finishes the setup.

If it is determined in Step S20 that the user finishes the setup, that is, if the Quit button 165 in the audio format setup screen 151 (FIG. 5) is pressed, then in Step S21, the controller unit 104 recognizes which setup item is selected for the encoding format, the sampling rate, the number of bits, and the number of channels and supplies the recognition result to the audio controller 102. The audio controller 102 stores (overwrites) the setup items selected by the user in the user setup information storage area 122 in the storage unit 103 in association with the monitor ID.

In Step S22, the audio controller 102 internally sets the audio signal so as to be output in the format in accordance with the setup items selected by the user and terminates the process.

The audio format setup process is performed in the above manner when the monitor apparatus 12 is connected to the image processing apparatus 11. If the image processing apparatus 11 is recovered from a suspended state or pause state, the process may be started from Step S15.

Figure 8:
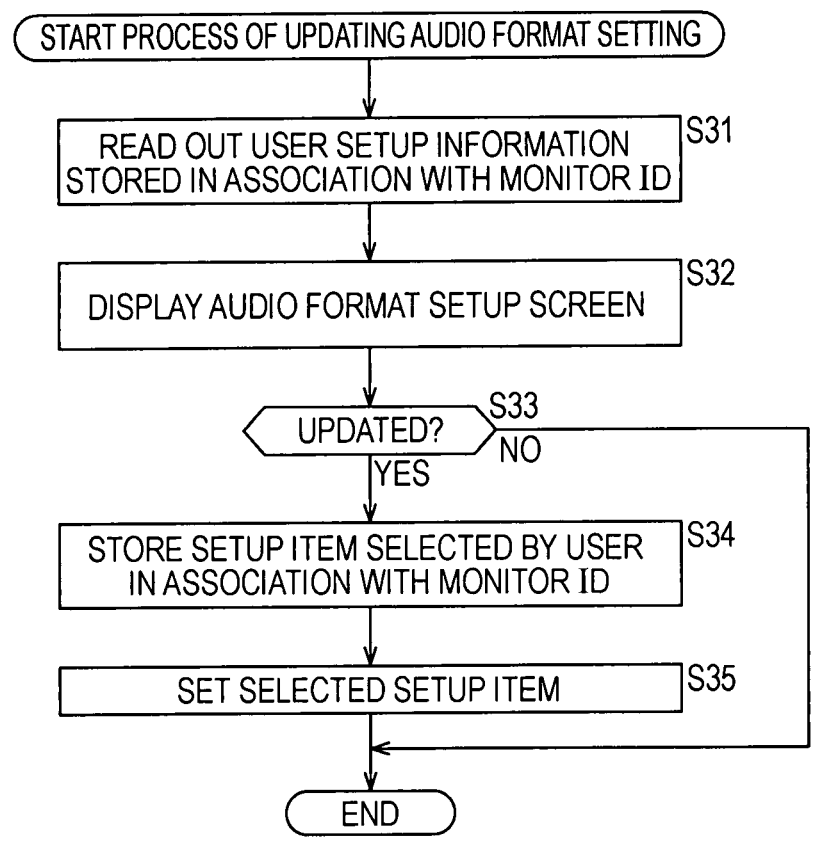
FIG. 8 is a flowchart showing a process of updating audio format settings.

FIG. 8 is a flowchart showing a process of updating audio format settings when the current settings of the audio format are to be updated. The user can update the settings of the format of the audio signal to be output from the image processing apparatus 11 at any time while the monitor apparatus 12 is connected to the image processing apparatus 11. The process of updating audio format settings is started when an instruction to update the audio format is issued, for example, in a setup menu.

In Step S31, the audio controller 102 acquires the EDID concerning the active monitor apparatus 12 from the EDID storage area 121, reads out the user setup information stored in the user setup information storage area 122 in association with the monitor ID of the monitor apparatus 12, and supplies the audio format information and the user setup information to the controller unit 104.

In Step S32, the controller unit 104 generates screen data for the audio format setup screen in which the check box corresponding to each of the setup items that were previously set is checked as default, on the basis of the user setup information and the setup items of the encoding format, the sampling rate, the number of bits, and the number of channels, which are based on the audio format information and which the monitor apparatus 12 can receive, and supplies the generated screen data to the video controller 101 to display the audio format setup screen in the monitor apparatus 12.

In Step S33, the process waits until the user finishes the selection of each setup item. After the selection by the user is finished, it is determined whether the selected setup item is updated. If it is determined in Step S33 that the selected setup item is not updated, the process skips Steps S34 and S35 and terminates.

If it is determined in Step S33 that the selected setup item is updated, then in Step S34, the controller unit 104 recognizes which setup item is selected for the encoding format, the sampling rate, the number of bits, and the number of channels and supplies the recognition result to the audio controller 102. The audio controller 102 stores (overwrites) the setup items selected by the user in the user setup information storage area 122 in the storage unit 103 in association with the monitor ID.

In Step S35, the audio controller 102 internally sets (updates) the audio signal so as to be output in the format in accordance with the setup items selected by the user and terminates the process.

Figure 7:
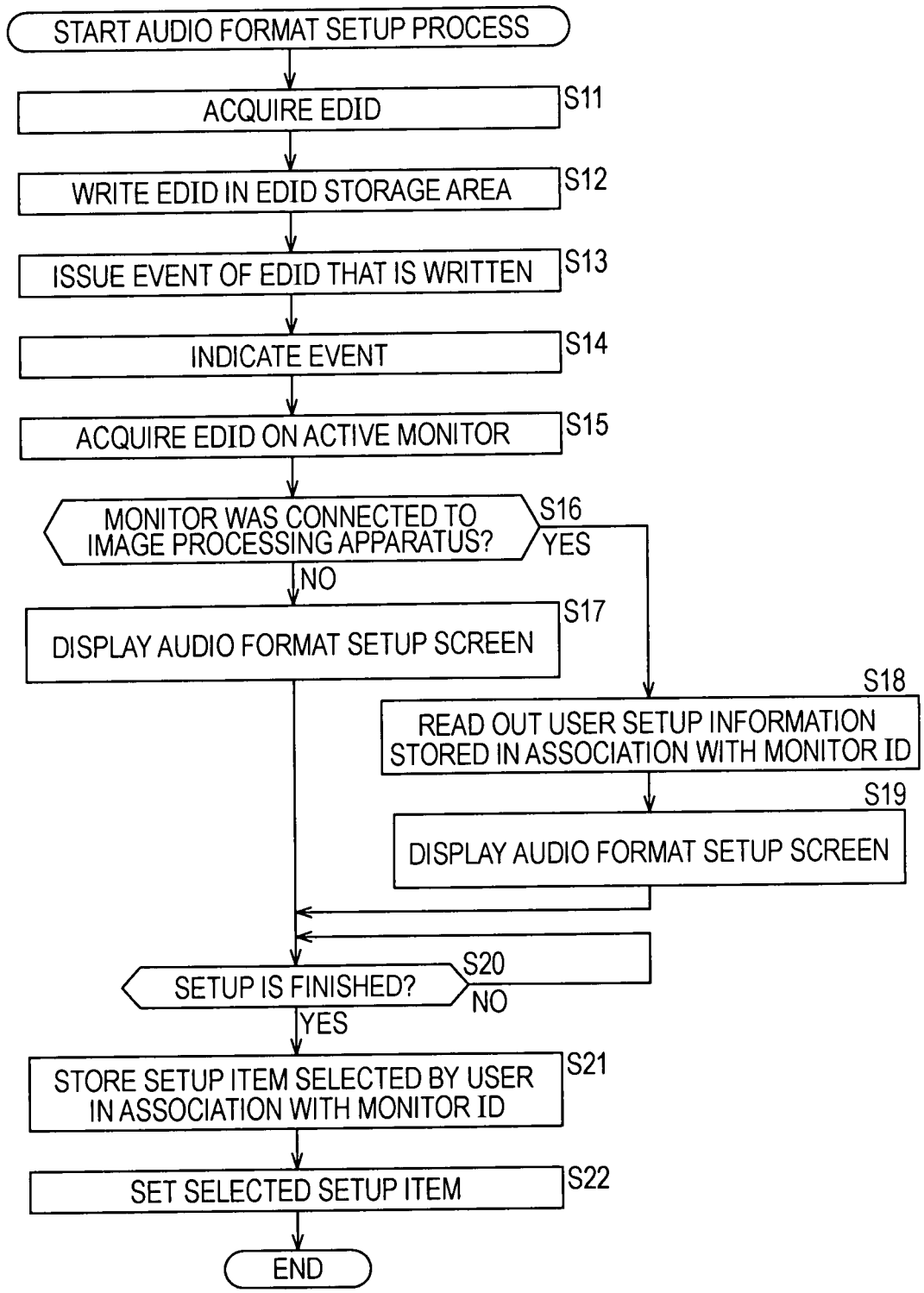
FIG. 7 is a flowchart showing an audio format setup process.

In the audio format setup processes shown in FIGS. 7 and 8, when the monitor apparatus 12 is connected to the image processing apparatus 11 via the HDMI cable 13, the image processing apparatus 11 displays the audio format setup screen on the basis of the EDID acquired from the monitor apparatus 12. Only the setup items of the audio signal, which the monitor apparatus 12 can receive, are enabled in the audio format setup screen. The user selects (specifies) the format of the audio signal to be supplied from the image processing apparatus 11 to the monitor apparatus 12 on the audio format setup screen. Accordingly, it is possible to prevent the user who is not familiar with the setup of the audio output from selecting inappropriate setup items. In addition, since the audio format is set with the graphical user interface (GUI), easy setup can be achieved.

When the connected monitor apparatus 12 was previously connected to the image processing apparatus 11, the image processing apparatus 11 displays the audio format setup screen on the basis of the user setup information. The check box corresponding to each of the setup items that were previously set is selected in advance in the audio format setup screen. The user selects (specifies) the format of the audio signal to be supplied from the image processing apparatus 11 to the monitor apparatus 12 on the audio format setup screen. Accordingly, the user can easily and rapidly confirm the previous settings.

In addition, the image processing apparatus 11 stores the EDID concerning the monitor apparatus 12 and the user setup information when the monitor apparatus 12 is connected to the image processing apparatus 11 in the EDID storage area 121 and the user setup information storage area 122, respectively, in the storage unit 103. Accordingly, when the monitor apparatus 12 that was previously connected to the image processing apparatus 11 is connected to the image processing apparatus 11 again, the image processing apparatus 11 can read out the EDID concerning the monitor apparatus 12 and the user setup information from the EDID storage area 121 and the user setup information storage area 122, respectively, in the storage unit 103 to rapidly and appropriately set the format of the audio signal to be output to the monitor apparatus 12.

An audio format setup process performed when the connected monitor apparatus 12 does not have the audio output function will now be described.

In the processes described above with reference to FIGS. 7 and 8, the audio signals which the image processing apparatus 11 outputs through the HDMI connector 55, the S/PDIF output terminal 62, and the analog output terminal 63 have the formats which the monitor apparatus 12 can receive. Accordingly, even if an audio (audio signal) having a quality higher than that of the format which the monitor apparatus 12 can receive can be output through the S/PDIF output terminal 62 and the analog output terminal 63 in the image processing apparatus 11, the audio signal can be updated to (limited to) an audio (audio signal) having the lower quality which the monitor apparatus 12 can receive.

For example, if the monitor apparatus 12 can receive only 16-bit and 20-bit audio signals at sampling rates of 44.1 kHz and 48 kHz even when the 24-bit audio signal at a sampling rate of 192 kHz can be output through the S/PDIF output terminal 62, the audio controller 102 outputs the 20-bit audio signal at a sampling rate of 48 kHz, which is the same as the audio signal to be output to the monitor apparatus 12, through the S/PDIF output terminal 62.

However, if the monitor apparatus 12 does not have the audio output function, the format of the audio signal is not limited to the one which the monitor apparatus 12 can receive and it is possible to set a format of the audio signal which can be output through the S/PDIF output terminal 62 and the analog output terminal 63 in the image processing apparatus 11.

Figure 9:
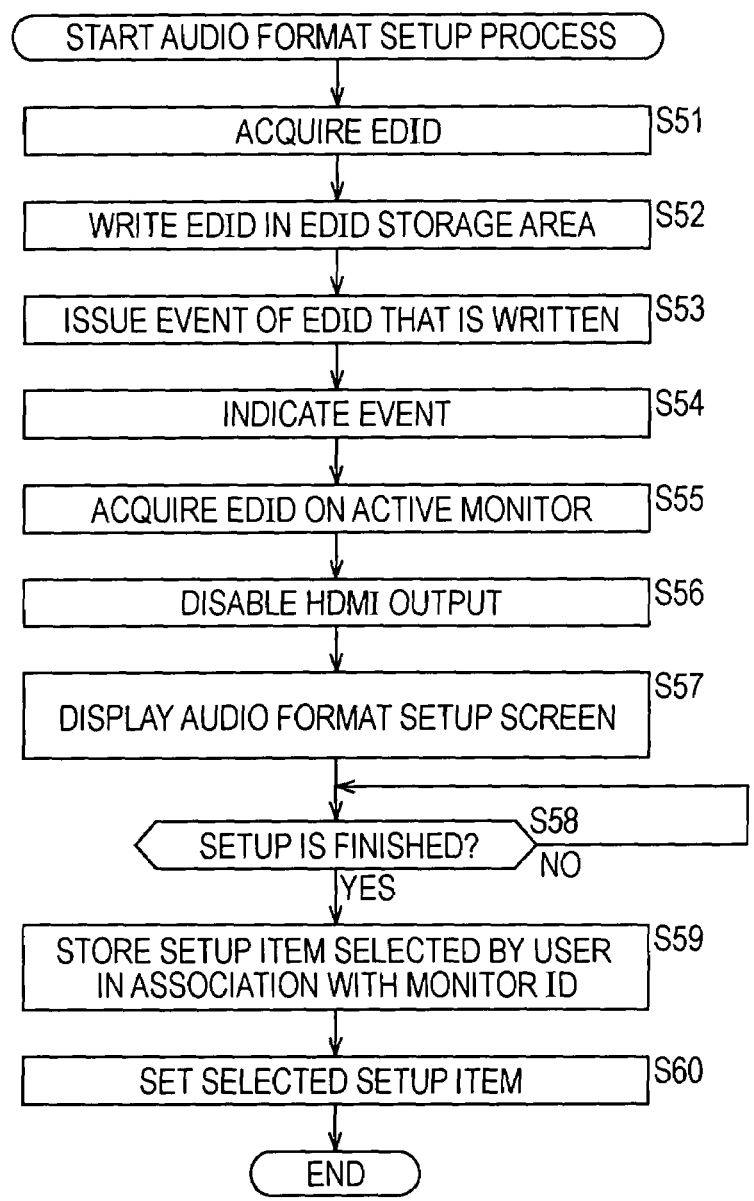
FIG. 9 is a flowchart showing another audio format setup process.

Consequently, if the monitor apparatus 12 does not have the audio output function, the image processing apparatus 11 follows another audio format setup process shown in a flowchart in FIG. 9 to determine (set) a format of the audio signal to be output through the S/PDIF output terminal 62 and the analog output terminal 63.

In Step S51, the EDID acquirer 111 acquires EDID concerning the monitor apparatus 12. In Step S52, the EDID acquirer 111 stores (writes) the acquired EDID in the EDID storage area 121 in the storage unit 103.

In Step S53, the EDID acquirer 111 issues an event indicating that the EDID concerning the monitor apparatus 12 is written in the EDID storage area 121 to the controller unit 15.

In Step S54, the controller unit 104 indicates the event indicating that the EDID is written to the audio controller 102.

In Step S55, the audio controller 102 acquires the EDID concerning the active monitor, that is, the monitor apparatus 12 currently connected to the image processing apparatus 11 and goes to Step S56.

In Step S56, the audio controller 102 recognizes that the monitor apparatus 12 currently connected to the image processing apparatus 11 does not have the audio output function on the basis of the acquired EDID and disables the HDMI output. Specifically, the audio controller 102 disconnects the line through which the audio signal is supplied to the video controller 101.

In Step S57, the audio controller 102 supplies the information (the audio format information) concerning the format of the audio signal which can be output through the S/PDIF output terminal 62 and the analog output terminal 63 to the controller unit 104. In addition, in Step S57, the controller unit 104 generates screen data for the audio format setup screen on the basis of the audio format information and supplies the generated screen data to the video controller 101 to display the audio format setup screen in the monitor apparatus 12. In Step S57, the default setup items (or the setup items which the user previously set) when the monitor apparatus 12 does not have the audio output function may be stored in the user setup information storage area 122 and the audio format setup screen in which the setup items read out from the user setup information storage area 122 are checked may be displayed.

In Step S58, it is determined whether the user finishes the setup (update) of the setup items of the encoding format, the sampling rate, the number of bits, and the number of channels. The process waits until it is determined that the user finishes the setup.

If it is determined in Step S58 that the user finishes the setup, that is, if the Quit button 165 in the audio format setup screen 151 (FIG. 5) is pressed, then in Step S59, the controller unit 104 recognizes which setup item is selected for the encoding format, the sampling rate, the number of bits, and the number of channels and supplies the recognition result to the audio controller 102. The audio controller 102 stores (overwrites) the setup items selected by the user in the user setup information storage area 122 in association with the monitor ID.

In Step S60, the audio controller 102 internally sets the audio signal so as to be output in the format in accordance with the setup items selected by the user and terminates the process.

As described above, when the monitor apparatus 12 connected to the image processing apparatus 11 does not have the audio output function, the user can select a desired format from all the formats of the audio signal, which the image processing apparatus 11 can output, because the capability of the monitor apparatus 12 does not restrict the audio output.

In the above examples, the controller unit 104 generates the screen data for the audio format setup screen in which the audio format information is displayed and supplies the generated screen data to the video controller 101 to display the audio format setup screen in the monitor apparatus 12. However, the audio controller 102 may generate the screen data for the audio format setup screen in which the audio format information is displayed and supplies the generated screen data to the video controller to display the audio format setup screen in the monitor apparatus 12. In this case, it is possible to update the audio format setup screen by updating the audio driver in the audio controller 101. In other words, it is easy to accommodate a request from the user, to modify the audio format setup screen into a more user-friendly screen, or to update the audio format setup screen to a screen having more functions.

Although the video controller 101 issues an event to the controller unit 104 that indicates the event to the audio controller 102 in the examples described above, the video controller 101 may directly indicate the event to the audio controller 102. Alternatively, the audio controller 102 may monitor and detect the event indicated by the video controller 101 to the controller unit 104.

In addition, the format (the setup items) of the image signal may be linked with the format (the setup items) of the audio signal and the linked formats may be stored in the user setup information storage area 122 in the storage unit 103.

If a time required for processing the image signal is different from a time required for processing the audio signal in the monitor apparatus 12 and an image displayed in the display 76 in the monitor apparatus 12 is not synchronized with audios output from the left speaker 78L and the right speaker 78R, a correction time for the synchronization of the image with the audios may be set (input) on the audio format setup screen. The input correction time may also be stored in the user setup information storage area 122 in association with the monitor ID of the monitor apparatus 12. In such a case, if the monitor that was previously connected to the image processing apparatus 11 is connected to the image processing apparatus 11 again, it is possible to rapidly output the audio signal subjected to the correction during the correction time when the image displayed in the display 76 in the monitor apparatus 12 is synchronized with the audios output from the left speaker 78L and the right speaker 78R.

The previous setup items, instead of the user setup information for every monitor, may be stored in the user setup information storage area 122 and, if the image processing apparatus 11 is sequentially connected to the monitors, the audio format information concerning the sequentially connected monitor may be compared with the previous setup items to select an optimal setup item (providing a higher quality) in order to determine a format of the audio signal to be output.

The steps described in the flowcharts in this description may be performed in a time series manner in the described order or may be performed in parallel or individually.

The system represents the entire apparatus including the multiple units in this description.

It will be further understood by those skilled in the art that the foregoing description is of the preferred embodiments of the present invention and that various changes and modifications may be made to the invention without departing from the spirit and scope thereof.

The invention claimed is:

1. An information processing apparatus outputting a video signal and an audio signal to a display apparatus that is connected to the information processing apparatus, the information processing apparatus comprising:
    acquiring means for acquiring, from the display apparatus, display apparatus information concerning a format of the audio signal which the display apparatus can receive;
    first storing means for storing the acquired information;
    setting means for reading out the information stored in the first storing means when the information is stored in the first storing means to set the audio signal to a predetermined format included in the information; and
    a controller configured to output screen data for an audio format setup screen to the display apparatus based on the display apparatus information;
    wherein the controller is configured to output predetermined screen data when the display apparatus does not have an audio output function,
    wherein the predetermined screen data includes an indication of at least one encoding format of audio data which the display apparatus can receive, at least one sampling rate of audio data which the display apparatus can receive, at least one number of bits-per-sample of audio data which the display apparatus can receive, and at least one number of audio channels which the display apparatus can receive.

2. The information processing apparatus according to claim 1,
    wherein the acquiring means stores the acquired information in the first storing means and issues an event indicating that the information is stored in the first storing means, and
    wherein the setting means reads out the information stored in the first storing means when the event is detected to set the audio signal to a predetermined format included in the information.

3. The information processing apparatus according to claim 1,
    wherein the display apparatus is connected to the information processing apparatus via High-Definition Multimedia Interface, and
    wherein the information is extended display identification data.

4. The information processing apparatus according to claim 1,
    wherein the information includes information concerning an encoding format, a sampling rate, the number of bits, or the number of channels of the audio signal.

5. The information processing apparatus according to claim 1, further comprising:
    screen generating means for generating, on the basis of the information, a screen in which at least one setup item for the format of the audio signal is displayed; and
    selecting means for selecting a predetermined setup item from the at least one setup item displayed in the screen,
    wherein the setting means sets the audio signal to a format in accordance with the predetermined setup item selected by the selecting means.

6. The information processing apparatus according to claim 5, further comprising:
    second storing means for storing the selected predetermined setup time,
    wherein the screen generating means generates the screen in which the selected predetermined setup item is selected in advance when the information processing apparatus is connected to the display apparatus again.

7. The information processing apparatus according to claim 1, wherein the controller is configured to output screen data for the audio format setup screen including a correction time information item for the synchronization of the video signal with the audio signal to be output from the information processing apparatus, when the display apparatus has an audio output function.

8. An information processing method for an information processing apparatus outputting a video signal and an audio signal to a display apparatus that is connected to the information processing apparatus, the information processing method comprising the steps of:

acquiring, from the display apparatus, display apparatus information concerning a format of the audio signal which the display apparatus can receive;

storing the acquired information in storing means; and reading out the information stored in the storing means when the information is stored in the storing means to set the audio signal to a predetermined format included in the information; and outputting screen data for an audio format setup screen to the display apparatus based on the display apparatus information;

wherein predetermined screen data is output when the display apparatus does not have an audio output function, wherein the predetermined screen data includes an indication of at least one encoding format of audio data which the display apparatus can receive, at least one sampling rate of audio data which the display apparatus can receive, at least one number of bits-per-sample of audio data which the display apparatus can receive, and at least one number of audio channels which the display apparatus can receive.

9. The information processing method according to claim 8, wherein the screen data for the audio format setup screen includes a correction time information item for the synchronization of the video signal with the audio signal to be output from the information processing apparatus, when the display apparatus has an audio output function.

10. A non-transitory computer-readable medium having stored thereon a computer-readable program causing a computer to perform a process of outputting a video signal and an audio signal to a display apparatus that is connected to the computer, the program comprising the steps of:

acquiring, from the display apparatus, display apparatus information concerning a format of the audio signal which the display apparatus can receive;

storing the acquired information in storing means; and reading out the information stored in the storing means when the information is stored in the storing means to set the audio signal to a predetermined format included in the information; and outputting screen data for an audio format setup screen to the display apparatus based on the display apparatus information;

wherein predetermined screen data is output when the display apparatus does not have an audio output function, wherein the predetermined screen data includes an indication of at least one encoding format of audio data which the display apparatus can receive, at least one sampling rate of audio data which the display apparatus can receive, at least one number of bits-per-sample of audio data which the display apparatus can receive, and at least one number of audio channels which the display apparatus can receive.

11. The medium according to claim 10, wherein the screen data for the audio format setup screen includes a correction time information item for the synchronization of the video signal with the audio signal to be output from the computer, when the display apparatus has an audio output function.

* * * * *

UNITED STATES PATENT AND TRADEMARK OFFICE
CERTIFICATE OF CORRECTION

PATENT NO. : 8,705,941 B2  
APPLICATION NO. : 11/792882  
DATED : April 22, 2014  
INVENTOR(S) : Qing Pan et al.

Page 1 of 1

It is certified that error appears in the above-identified patent and that said Letters Patent is hereby corrected as shown below:

On the Title page, under Item (86), "PCT/JP2006/019256" should read --PCT/JP2006/319256--

Signed and Sealed this  
Fifteenth Day of July, 2014

Michelle K. Lee  
*Deputy Director of the United States Patent and Trademark Office*